Patented Jan. 5, 1954

2,665,284

UNITED STATES PATENT OFFICE 2,665,284

COPOLYMERS

Daniel J. Carlick, Roselle, N. J., assignor to Interchemical Corporation, New York, N. Y., a corporation of Ohio No Drawing. Application September 26, 1951,
Serial No. 248,469

5 Claims. (Cl. 260—407)

This invention relates to the field of drying oils, and is particularly directed at the production of modified copolymers of drying oils and styrene, which are freely soluble in aliphatic hydrocarbon solvents.

The copolymerization of drying oils with styrene has been extensively studied in recent years, and such copolymers have been used in substantial quantities in the paint industry; the copolymers, in comparison with bodied oils of the same viscosity, give additional adhesion, gloss, hardness, chemical and weather resistance, and faster drying. However, because the copolymers, unlike ordinary bodied oils, are not soluble in the cheap aliphatic petroleum hydrocarbons, their use has been limited in paints, and are all but prohibited in printing inks, which in general must be free of materials having marked solvent action on the synthetic rubbers used in printing press distribution systems.

I have discovered that it is possible to copolymerize drying oils with styrene, while obtaining products which are freely soluble in low solvency aliphatic petroleum hydrocarbons, and have all the advantages of ordinary styrenated oils except fast drying—the results are obtained by adding to the reaction mixture a minor percentage of a methyl 1-3 pentadiene, and polymerizing in the presence of an organic oxygen yielding catalyst.

In general, optimum properties are obtained in these copolymers if the oil is kept within the range of 35 to 75% of the copolymer. Below 35% of oil, the copolymers are essentially plasticized polystyrene; they are rubbery in character, and not freely soluble in aliphatics. Above 75% of oil, the effect of the adduct is not sufficiently great to show commercial differences. My best compositions contain between 50 and 60% of oil.

The methyl 1,3 pentadiene should be present in a minimum ratio by weight of 1 to 12 styrene; below this minimum, aliphatic hydrocarbon solubility is lost. Above 1 to 3 styrene, drying is slowed up so that the resultant products are impractical. The optimum ratio is 1 to 6.

Any organic oxygen yielding catalyst may be used for the reaction. Organic peroxides are preferred; the oxygen may be obtained by using drying oils which have been heavily blown; or other organic oxygen yielders may be substituted.

Typical examples are as follows:

Example 1

400 grams styrene
550 grams blown soya bean oil (blown to Z-2 viscosity on the Gardner-Holdt scale)
50 grams 2-methyl 1,3 pentadiene were heated during a 3 hour period to 400° F., in a closed system; an exothermic reaction occurred at 220° F., indicating commencement of the copolymerization. The heat was turned off, and the product blown with nitrogen. A very viscous oil was obtained in 96% yield, which was readily soluble in mineral spirits. It dried about as fast as the blown soya oil with added drier; otherwise its properties were superior to blown soya, yielding films with improved gloss, adhesion to metal, resistance to chemicals and abrasion.

Example 2

216 grams styrene (36%)
36 grams methyl 1,3 pentadiene (6%)
  (85% 2-methyl 15% 4-methyl)
132 grams blown soya oil of Example 1 (22%)
216 grams alkali refined linseed oil (36%)
4.3 grams benzoyl peroxide (2% of styrene)

were heated to about 400° F. over a 5 hour period, blown with $CO_2$ to strip the material; a freely aliphatic soluble oil of Z-7 body was obtained, with properties like the product of Example 1, but faster drying, and in 93% yield.

Example 3

216 grams styrene (36%)
36 grams methyl 1,3 pentadiene of Example 2 (6%)
348 grams dehydrated castor oil (58%)
2.2 grams cumene hyperperoxide treated like Example 2, gave 92% yield of an oil with a $Z_1$-$Z_2$ viscosity, which dried much faster than the oil of Example 2—approximately the speed of $Z_1$-$Z_2$ dehydrated castor oil.

Example 4.—Modified soya linseed oil

36%—1152 grams styrene (99% pure)
5%—192 grams methyl pentadiene (99%)—mixture of 85% 2-methyl 1,3 pentadiene, 15% 4-methyl 1,3 pentadiene
22%—704 grams oxidized soya oil ($Z_2$-$Z_3$ viscosity)
36%—1152 grams alkali refined soya oil
23 grams di-tertiary butyl peroxide were charged into a 5-liter 3-neck flask equipped with a stirrer, water trap / condenser, thermometer, a gas inlet tube and a heating mantle. The charge was heated to 220° F. in 30 minutes, under $CO_2$ or nitrogen; at this point, a slightly exothermic reaction set in; the temperature reached 260° F. in 15–20 minutes. Heavy reflux was maintained with temperature going up to 450° F. in about 4 hours; the batch was held at 450° F. for ½ hour, and vacuum stripped.

The yield was 3048 grams of a light colored clear oil having a viscosity of 315 poises at 30° C, It dried fairly well, and gave good films out of solutions in aliphatic petroleum hydrocarbon solvents.

In comparison with a similar oil made with 41% of styrene, and no methyl pentadiene, my oil is soluble in aliphatics, the straight styrenated oil is not; my oil dries about as fast as bodied linseed oil of the same viscosity, the styrenated oil dries faster; my oil is a much better pigment wetter than the straight styrenated oil. Both my oil and ordinary styrenated oils give improved gloss, adhesion to metal, and resistance to weather and abrasion. However, my oil is more compatible with other film formers.

*Example 5*

Into the same equipment as used in Example 4 charge:

(48%) 1536 grams styrene
(6%) 192 grams methyl pentadiene
(23%) 736 grams oxidized linseed oil ($Z_2$–$Z_3$ Visc.)
(23%) 736 grams alkali-refined linseed oil
30.7 grams di-tertiary butyl peroxide heat to 240° F. in 30 minutes—exothermic reaction temperature to 270° F. in five minutes, along with heavy reflux. Maintain heavy reflux until temperature of 450° F. is reached (2 hours, 15 min.), hold 30 minutes at 450° F., then vacuum strip. Yield 3104 g. of light-colored high viscosity-semi-solid mass. The product was soluble to 55% in low-solvency ink oils.

*Example 6*

Into the same equipment as used in Example 4 charge:

(38%) 1140 pounds styrene
(10%) 300 pounds methyl pentadiene
(42%) 1260 pounds dehydrated castor oil (Visc- 6–H)
(20%) 300 pounds dehydrated castor oil (Visc- $Z_2$–$Z_3$) 22.8 pounds di-tertiary butyl peroxide heat in one hour to 250° F., reduce heat when reflux begins because of exothermic reaction. Maintain maximum reflux and after one hour fifteen minutes temperature of flask is 285° F. Another 1¾ hours temperature is 380° F. Another two hours and thirty-five minutes temperature is 500° F., hold thirty minutes and vacuum strip. Yield 2896 pounds of heavy gel-like clear material. Very soluble in petroleum solvents.

*Example 7*

Same equipment as Example 4 except 1 liter system—charge:

(36%) 180 grams styrene
(3%) 15 grams methyl pentadiene
(22%) 110 grams oxidized soya ($Z_2$–$Z_3$ Visc.)
(39%) 195 grams dehydrated castor oil (Visc. G. H.)
4 grams di-tertiary butyl peroxide.

Produced 464 grams of a pale oil with a viscosity of 1848 poises at 30° C.

Obviously, examples can be multiplied indefinitely without departing from the scope of my invention, as defined in the claims. In particular, the reaction is between the styrene, the conjugated double bonds in the methyl 1,3 pentadiene and the doubly unsaturated fatty acids present in the drying oil. It should be noted that the reaction goes with fatty acids, which can (like the oils themselves), be converted into alkyd resins.

My oils are particularly useful in paints and printing inks, and in the production of alkyd resins.

I claim:

1. A modified drying oil soluble in aliphatic hydrocarbon solvents, comprising a copolymer formed in the presence of an organic oxygen yielding catalyst of from 35 to 75% of fatty drying oil and from 65 to 25% of unsaturated hydrocarbons consisting of 1 part of methyl 1,3 pentadiene to from 3 to 12 parts of styrene.

2. A modified drying oil soluble in aliphatic hydrocarbon solvents, comprising a copolymer formed in the presence of an organic oxygen yielding catalyst of from 35 to 75% of fatty drying oil and from 65 to 25% of unsaturated hydrocarbons consisting of 1 part of methyl 1,3 pentadiene to 6 parts of styrene.

3. A modified drying oil soluble in aliphatic hydrocarbon solvents, comprising a copolymer formed in the presence of an organic oxygen yielding catalyst of from 50 to 60% of fatty drying oil and from 50 to 40% of unsaturated hydrocarbons consisting of 1 part of methyl 1,3 pentadiene to 6 parts of styrene.

4. The method of producing a modified drying oil soluble in aliphatic hydrocarbon solvents, which comprises heating 35 to 75% of a fatty drying oil with from 65 to 25% of a mixture of unsaturated hydrocarbons in the presence of an organic peroxide, the mixture consisting of 1 part of methyl 1,3 pentadiene to from 3 to 12 parts of styrene, continuing the heating until copolymerization is substantially complete, and stripping off the unreacted unsaturated hydrocarbon.

5. The reaction product of 35 to 65% of a doubly unsaturated acid derived from a fatty glyceride oil with 65 to 35% of a mixture of unsaturated hydrocarbons consisting of 1 part of methyl 1,3-pentadiene and 3 to 12 parts of styrene, said reaction product being formed in the presence of an organic oxygen yielding catalyst.

DANIEL J. CARLICK.

References Cited in the file of this patent

UNITED STATES PATENTS

| Number | Name | Date |
|---|---|---|
| 2,392,710 | Wakeford et al. | Jan 8, 1946 |
| 2,556,336 | Nye | June 12, 1951 |
| 2,574,753 | Opp et al. | Nov. 13, 1951 |